(12) United States Patent
Nielsen et al.

(10) Patent No.: US 7,952,217 B2
(45) Date of Patent: May 31, 2011

(54) WIND TURBINE, A METHOD FOR CONTROLLING A WIND TURBINE AND USE THEREOF

(75) Inventors: Thomas Steiniche Bjertrup Nielsen, Randers (DK); Bo Juul Pedersen, Hadsten (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/744,820

(22) PCT Filed: Nov. 27, 2008

(86) PCT No.: PCT/DK2008/000420
§ 371 (c)(1),
(2), (4) Date: May 26, 2010

(87) PCT Pub. No.: WO2009/068035
PCT Pub. Date: Jun. 4, 2009

(65) Prior Publication Data
US 2010/0301605 A1    Dec. 2, 2010

(30) Foreign Application Priority Data
Nov. 30, 2007   (DK) .................................. 2007 01713

(51) Int. Cl.
*F03D 9/00*    (2006.01)
*H02P 9/04*    (2006.01)
*B64C 11/00*   (2006.01)
*B64C 27/00*   (2006.01)
*F01D 5/18*    (2006.01)

(52) U.S. Cl. ................................. 290/44; 290/55; 416/1

(58) Field of Classification Search .................... 290/44, 290/55; 416/1
See application file for complete search history.

(56) References Cited

U.S. PATENT DOCUMENTS 3,971,166 A * 7/1976 Habeck et al. ................ 451/297
4,161,658 A * 7/1979 Patrick ........................... 290/44
(Continued)

FOREIGN PATENT DOCUMENTS
EP   1 429 025   6/2004
(Continued)

OTHER PUBLICATIONS

Gabriele Giorgini; International Search Report and Written Opinion issued in related PCT patent application No. PCT/DK2008/000420; Mar. 22, 2010; 13 pages; European Patent Office.

(Continued)

*Primary Examiner* — Pedro J Cuevas
(74) *Attorney, Agent, or Firm* — Wood, Herron & Evans, LLP

(57) ABSTRACT

The invention relates to a wind turbine comprising a rotor including one or more pitchable blades, registration means for registering an idling power producing situation of the wind turbine in relation to a utility grid, detection means for detecting edgewise oscillations in one or more of the blades, and control means for controlling the pitch angle of one or more of the blades. The control means is adapted for changing the pitch angle of one or more of the blades when the registration means registers that the wind turbine is operating in an idling power producing situation and the detection means detects edgewise oscillations in one or more of the blades, hereby damping or eliminating the edgewise oscillations. The invention further relates to a method for controlling a wind turbine and use hereof.

16 Claims, 5 Drawing Sheets

U.S. PATENT DOCUMENTS

Figure 1:
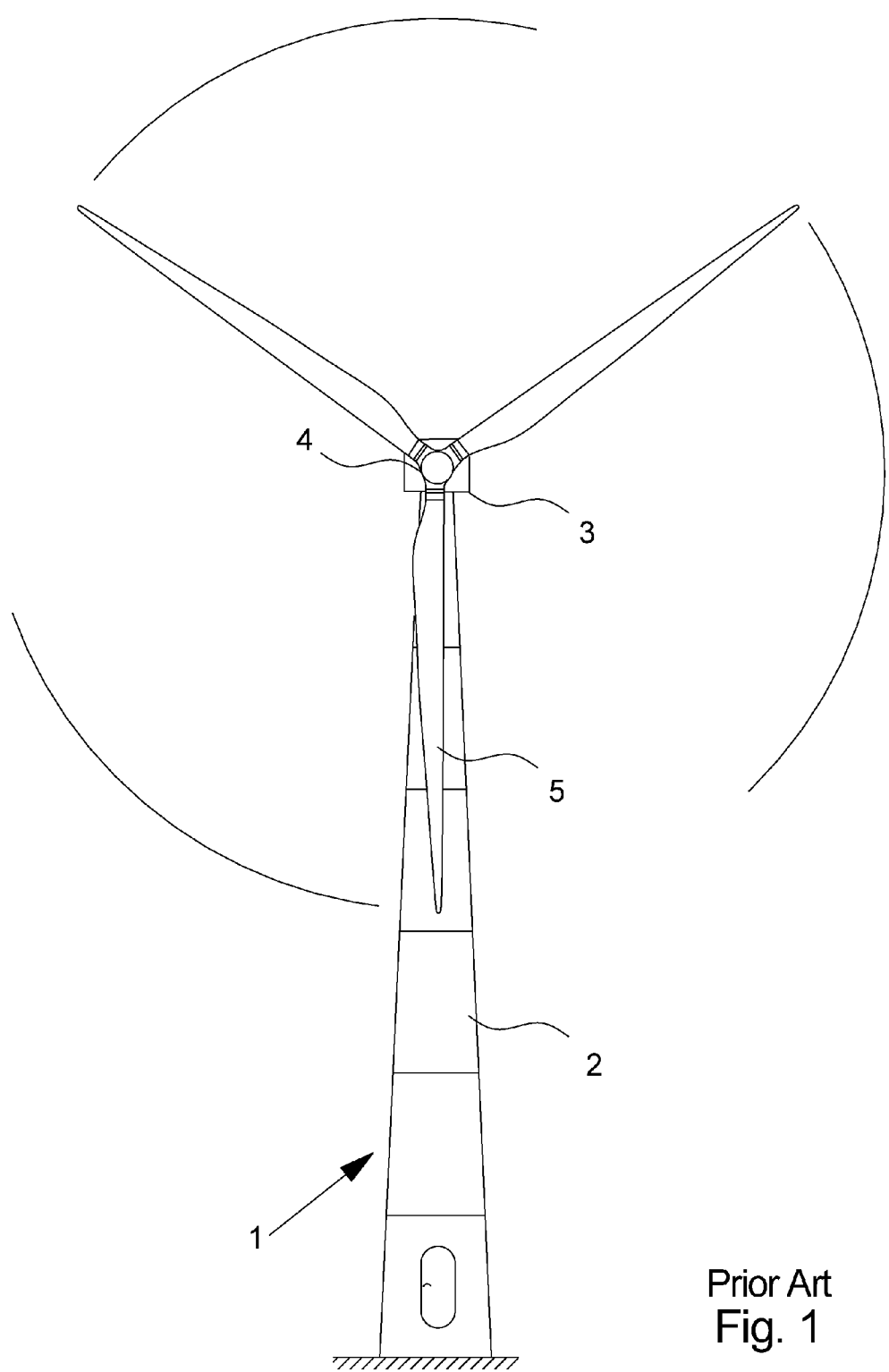

| | | | |
|---|---|---|---|
| 4,193,005 A * | 3/1980 | Kos et al. | 290/44 |
| 4,280,059 A * | 7/1981 | Zickwolf, Jr. | 290/40 B |
| 4,297,076 A | 10/1981 | Donham et al. | 416/37 |
| 4,334,823 A | 6/1982 | Sharp | 416/119 |
| 4,426,192 A * | 1/1984 | Chertok et al. | 416/1 |
| 4,515,525 A * | 5/1985 | Doman | 416/11 |
| 4,677,364 A * | 6/1987 | Williams et al. | 322/47 |
| 5,083,039 A * | 1/1992 | Richardson et al. | 290/44 |
| 5,155,375 A * | 10/1992 | Holley | 290/44 |
| 5,907,192 A * | 5/1999 | Lyons et al. | 290/44 |
| 6,626,642 B1 * | 9/2003 | Veldkamp | 416/79 |
| 6,672,837 B1 * | 1/2004 | Veldkamp et al. | 416/144 |
| 6,856,040 B2 * | 2/2005 | Feddersen et al. | 290/44 |
| 6,933,625 B2 * | 8/2005 | Feddersen et al. | 290/44 |
| 7,015,595 B2 * | 3/2006 | Feddersen et al. | 290/44 |
| 7,095,128 B2 * | 8/2006 | Canini et al. | 290/44 |
| 7,095,129 B2 * | 8/2006 | Moroz | 290/44 |
| 7,095,131 B2 * | 8/2006 | Mikhail et al. | 290/44 |
| 7,166,928 B2 * | 1/2007 | Larsen | 290/55 |
| 7,239,036 B2 * | 7/2007 | D'Atre et al. | 290/44 |
| 7,256,509 B2 * | 8/2007 | Brandt et al. | 290/44 |
| 7,312,537 B1 * | 12/2007 | Walling | 290/44 |
| 7,417,333 B2 * | 8/2008 | Miller et al. | 290/44 |
| 7,436,083 B2 * | 10/2008 | Shibata et al. | 290/44 |
| 7,755,210 B2 * | 7/2010 | Kammer et al. | 290/44 |
| 7,837,439 B2 * | 11/2010 | Bech | 416/62 |
| 7,854,589 B2 * | 12/2010 | Nielsen et al. | 416/1 |
| 2005/0012339 A1 * | 1/2005 | Mikhail et al. | 290/44 |
| 2006/0001268 A1 | 1/2006 | Moroz | 290/44 |
| 2008/0106098 A1 * | 5/2008 | Miller et al. | 290/44 |
| 2009/0142193 A1 * | 6/2009 | Bech | 416/144 |
| 2009/0169357 A1 * | 7/2009 | Slack | 415/26 |
| 2009/0185901 A1 * | 7/2009 | Nielsen et al. | 416/1 |
| 2009/0246020 A1 * | 10/2009 | Nielsen et al. | 416/1 |
| 2010/0021303 A1 * | 1/2010 | Nielsen et al. | 416/145 |
| 2010/0189560 A1 * | 7/2010 | Haraguchi | 416/1 |
| 2010/0239426 A1 * | 9/2010 | Westergaard | 416/226 |
| 2010/0263448 A1 * | 10/2010 | Hughes et al. | 73/577 |
| 2010/0275695 A1 * | 11/2010 | Cotrell et al. | 73/663 |
| 2010/0301604 A1 * | 12/2010 | Nielsen et al. | 290/44 |
| 2010/0301605 A1 * | 12/2010 | Nielsen et al. | 290/44 |
| 2010/0314883 A1 * | 12/2010 | Ollgaard | 290/55 |
| 2011/0041617 A1 * | 2/2011 | Cotrell et al. | 73/660 |

FOREIGN PATENT DOCUMENTS

| | | |
|---|---|---|
| EP | 1 612 412 | 1/2006 |
| WO | 97/42409 | 11/1997 |
| WO | WO 9963219 A1 * | 12/1999 |
| WO | 02/086314 | 10/2002 |
| WO | 2005/017350 | 2/2005 |
| WO | 2007/071239 | 6/2007 |
| WO | 2007/104306 | 9/2007 |
| WO | WO 2009068035 A2 * | 6/2009 |
| WO | WO 2009068036 A2 * | 6/2009 |

OTHER PUBLICATIONS

Daniel Trudnowski et al.; Independent Pitch Control Using Rotor Position Feedback for Wind-Shear and Gravity Fatigue Reduction in a Wind Turbine; May 8-10, 2002; pp. 4335-4340; Proceedings of the American Control Conference; Anchorage, AK.

* cited by examiner

US 7,952,217 B2

WIND TURBINE, A METHOD FOR CONTROLLING A WIND TURBINE AND USE THEREOF

BACKGROUND OF THE INVENTION

The invention relates to a wind turbine, a method for controlling a wind turbine and use hereof.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Oscillations and vibrations of the wind turbine blades are undesirable in that they strain the blade and the wind turbine structure unnecessarily which in worst-case can lead to reduced life of the blades or other parts or the wind turbine. In particular edge-wise oscillations is undesirable, in that the blade has little damping towards this mode of oscillations. Edgewise oscillations are oscillations along the chord between the trailing edge and the leading edge of the blade but because of the complex blade design of modern wind turbines and particularly because the blade twists in its longitudinal extend, edgewise oscillations will typically to some degree be combined with flap-wise oscillations, which is oscillations between the pressure side and the leeward side of the blade i.e. substantially perpendicular to the edgewise direction.

Edgewise oscillations are typically seen in both stall and pitch controlled wind turbines when the rotor is rotating and the wind turbine is producing power to a utility grid i.e. the wind turbine is operating. The stall controlled turbine is mostly seeing this problem when operating in high winds beyond the stall point and the pitch regulated turbine is mostly seeing this problem when operating in high wind where sudden wind gusts can cause the blades to stall momentarily.

But as wind turbines and wind turbine blades are getting larger and larger the properties of the blades changes accordingly such as the blade damping and/or the blade eigenfrequencies and therefore edgewise oscillations is also known to occur in the blades of wind turbines which are not operating i.e. in wind turbines where the rotor is idling or put to a complete standstill and the wind turbine is substantially not producing power to a utility grid.

Known countermeasures against edgewise oscillations are all developed for operating wind turbines and are therefore more or less ineffective in relation with non-operating wind turbines.

An object of the invention is therefore to provide for an advantageous technique for damping or eliminating edgewise oscillations in a blade of a wind turbine operating in an idling power producing situation in relation to a utility grid.

THE INVENTION

The invention provides for a wind turbine comprising a rotor including one or more pitchable blades, registration means for registering an idling power producing situation of the wind turbine in relation to a utility grid, detection means for detecting edgewise oscillations in one or more of the blades, and control means for controlling the pitch angle of one or more of the blades. The control means is adapted for changing the pitch angle of one or more of the blades when the registration means registers that the wind turbine is operating in an idling power producing situation and the detection means detects edgewise oscillations in one or more of the blades, hereby damping or eliminating the edgewise oscillations.

Certain conditions have to be present for edgewise oscillations to occur in the idling wind turbine blades: the wind has to have a certain critical wind speed, the blades have to have a certain design, the blades have to be placed at a certain pitch angle and other. Most of these conditions can not be controlled or at least can not be controlled inexpensively—except for the pitch angle of the blades.

Active stall controlled wind turbines and pitch controlled wind turbines are by nature provided with the ability to change the pitch angle of the blades to control the power output of the rotor or the wind turbine during operation and to protect the blades or the wind turbine from damaging overloads.

Although for other purposes, the ability to pitch the wind turbine blades is therefore already present in most modern wind turbines and by using this ability to alter at least one of the conditions needed for edgewise oscillations to occur or at least for edgewise oscillations to build up is advantageous, in that simple and cost-efficient means hereby is provided for damping or eliminating the edgewise oscillations in the blades of a wind turbine operating in an idling power producing situation in relation to a utility grid.

It should be emphasised that by the term "an idling power producing situation of the wind turbine in relation to a utility grid" is to be understood that the wind turbine is in a non-operating mode i.e. it is substantially not producing power to a utility grid and the rotor is put to a complete standstill or it is idling.

In an aspect of the invention, said control means comprise means for pitching said blades in a direction which increases the lift of said blades, if said detection means detects edgewise oscillations in one or more of said blades.

Even at high wind speeds the rotor of an idling wind turbine will have a tendency to be standing still or at least rotate very slowly due to the feathered blades, but regarding edgewise vibrations, it is advantageous if the rotor to at least some degree rotates, in that the conditions inducing the edgewise vibrations would thereby constantly change, which would further amplify the oscillation damping effect of pitching the blade. Furthermore a rotating rotor would prevent high local loads over a long periode of time e.g. leading to impressions in the gearbox, bearings or other.

In an aspect of the invention, said control means comprises means for changing the pitch angle of all said blades of said rotor substantially equally, if said detection means detects edgewise oscillations in one or more of said blades.

It can be difficult and/or expensive to determine which of the blades that are oscillating edgewise and it is therefore advantageous to pitch all the blades if edgewise oscillations are detected on any of the rotor blades. The blades could then be pitched to different degrees or in different directions to reduce or increase the rotational speed of the rotor e.g. depending on the present rotational speed of the rotor or e.g. to reduce the load on the rotor brake if the rotor was locked to keep it from rotating during maintenance.

In an aspect of the invention, said detection means are one or more load sensors placed in or at said blade.

Load sensors placed in or at the blade, such as in or at the root of the blade, are advantageous in that such sensors are relatively simple and inexpensive and if properly implemented they provide reliable information on the load situation of the blade, including if the loads rhythmically shifts back and forth between the trailing edge side and the leading edge side of the blade, hereby indicating edgewise oscillations.

Furthermore, many modern wind turbines are already provided with load sensors in or at the blades to detect different loads during normal operation of the wind turbine i.e. when the wind turbine is producing power to a utility grid, and it is therefore advantageous and cost-effective to use the sensors that are already present.

In an aspect of the invention, said detection means are one or more accelerometers placed in or at said blade.

Accelerometers are excellent devices for providing information on the oscillation status of the blade and it is therefore advantageous to use accelerometers placed in or at the blade as detection means.

In an aspect of the invention, said detection means are one or more accelerometers placed in a nacelle of said wind turbine.

Usually the rotor rotates slowly when the wind turbine is idling and if one or more blades oscillate edgewise, these oscillations could transmit to the nacelle making the nacelle oscillate slightly around the yaw axis especially when the feathered oscillating blade is pointing sideward or the nacelle could tilt slightly in the vertical direction if the feathered oscillating blade is pointing upwards or downwards.

Only one or two accelerometers would then be needed to detect edgewise oscillations of the blades and since the nacelle presents a very controlled environment, where the accelerometer can be easily accessed, it is advantageous to place the oscillation sensors in the (more fixed) nacelle.

In an aspect of the invention, said control means comprise means for changing said pitch angle of one or more of said blades between 0.5° and 30°, preferably between 2° and 15° and most preferred between 3° and 8° if said detection means detects edgewise oscillations in one or more of said blades.

If the blades are pitched too little, when edgewise oscillations is detected, the oscillations might not be dampened or it takes a relative long time for the oscillations to stop. If the blades are pitched too much the blade or other parts of the wind turbine could be strained unnecessarily much or the rotor might start rotating too fast, which could be disadvantageous in that too fast rotation during idling could strain and wear different parts of the wind turbine unnecessarily and it could lead to the rotor going bolting.

The present ranges for changing the pitch angles—when edgewise oscillations are detected—therefore presents an advantageous relation between damping efficiency and safety.

In an aspect of the invention, said control means comprise means for only changing the pitch angle of one or more of said blades if said detected edgewise oscillations is above a predefined level.

Changing the blades pitch angle from their substantially optimal parking position, will most likely increase the strain on the blade and other parts of the wind turbine, so if the size of the edgewise oscillations is only minor and non-damaging or only occurs for a short period of time, it is advantageous to refrain from pitching the blades if the size of the oscillations is below a certain level.

In an aspect of the invention, said control means comprise means for returning said one or more blades to their original pitch angle position, when said detection means detects that the size of said edgewise oscillations is below a predefined level.

This is advantageous, in that the blades hereby are returned to their parking position fast, hereby reducing the strain on the blades and other parts of the wind turbine.

In an aspect of the invention, said control means further comprise a timer for giving of an alarm signal if the size of said edgewise oscillations has not dropped below a predefined level within a predefined period of time.

If the size of the edgewise oscillations has not dropped below a predefined level within a predefined period of time, something could be wrong or the blades could be damaged from the oscillations and it is therefore advantageous to make the control means give of an alarm. This alarm signal could then trigger that further edgewise oscillation damping procedures was commenced or it could be transferred to a surveillance centre or other that could evaluate the situation and take the necessary actions.

Furthermore, the invention provides for a method for controlling a wind turbine in an idling power producing situation in relation to a utility grid. The method comprises the steps of:
  registering if the wind turbine is operating in an idling power producing situation in relation to a utility grid,
  establishing a edgewise oscillation value of a wind turbine blade of the wind turbine, and
  changing the pitch angle of the blade if said wind turbine is operating in an idling power producing situation and the edgewise oscillation value is above a predefined level, hereby damping or eliminating the edgewise oscillation.

Hereby is provided a simple and cost-efficient method for damping or eliminating edgewise oscillations in the blades of a wind turbine in an idling power producing situation in relation to a utility grid.

In an aspect of the invention, said blade is returned to its original pitch angle position, when said edgewise oscillation value has dropped below a further predetermined level.

In an aspect of the invention, the pitch angle of all the blades of said wind turbine are changed substantially equally if said edgewise oscillation value is above a predefined level.

In an aspect of the invention, an alarm signal is transmitted if said edgewise oscillation value has not dropped below a predetermined level within a predetermined time.

In an aspect of the invention, said edgewise oscillation value is established by means of load measurements of said blade.

In an aspect of the invention, said blades are pitched in a direction which reduces the lift of said blades, if the rotational speed of a rotor comprising said blades is above a predefined level.

Edgewise oscillations in wind turbine blades of an idling wind turbine usually only occur at relatively high wind speeds. If the blades are pitched in a direction which increases the lift, when edgewise oscillations are detected, the rotor might start rotating too fast and the risk of wearing or overloading the blades or the wind turbine would increase. In is therefore advantageous to pitch the blades in a direction which reduces the lift of the blades, if the rotational speed of the rotor already is high or close to a predefined maximum rotational speed of an idling rotor.

In an aspect of the invention, said blades are pitched in a direction which increases the lift of said blades, if the rotational speed of a rotor comprising said blades is below a predefined level.

Certain conditions usually have to be present for the edgewise oscillations to occur and build up, and one of these conditions could be the winds attacking the blade at a specific angle. By increasing the lift the chance of the rotor rotating is increased, hereby making the angle of attack vary to a degree that would contribute to the oscillations stopping or at least being dampened.

Even further, the invention provides for a method according to any of the above, wherein said wind turbine is a pitch or active stall controlled wind turbine which comprises means for detecting edgewise oscillations.

Using the previously mentioned method on a pitch or active stall controlled wind turbine is advantageous, in that these types of wind turbines by nature is provided with means for pitching the blades and if the wind turbines further comprise means for detecting edgewise oscillations in the blades the use is even more advantageous.

FIGURES

Figure 2:
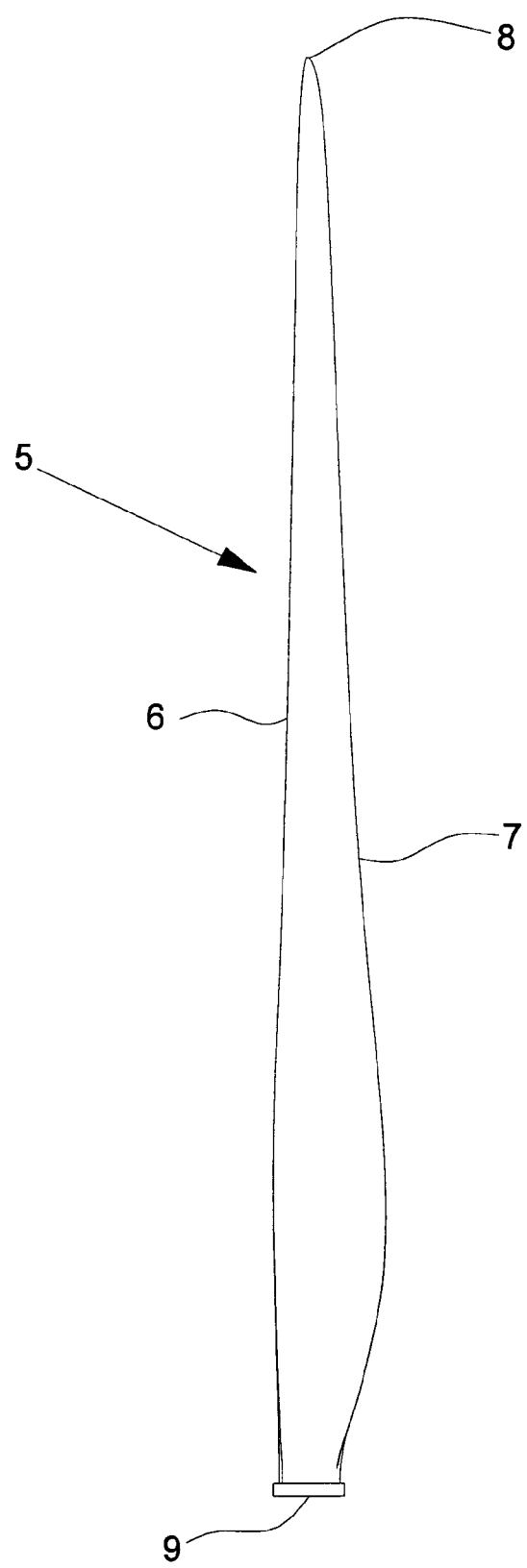
Figure 3:
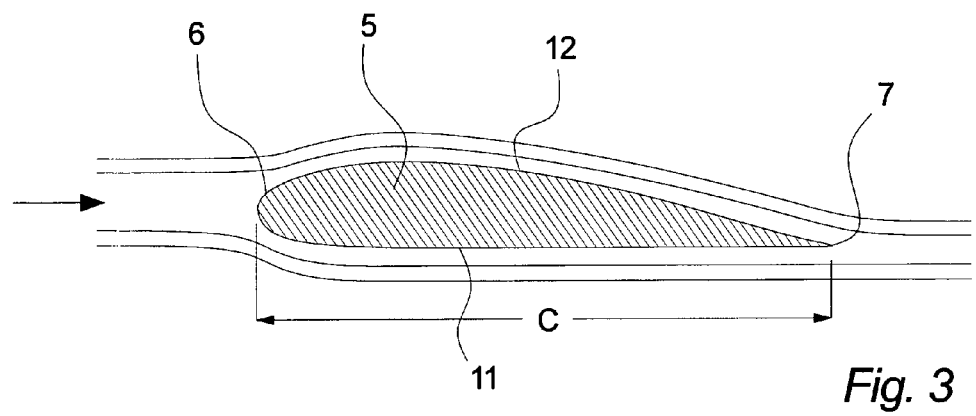
Figure 4:
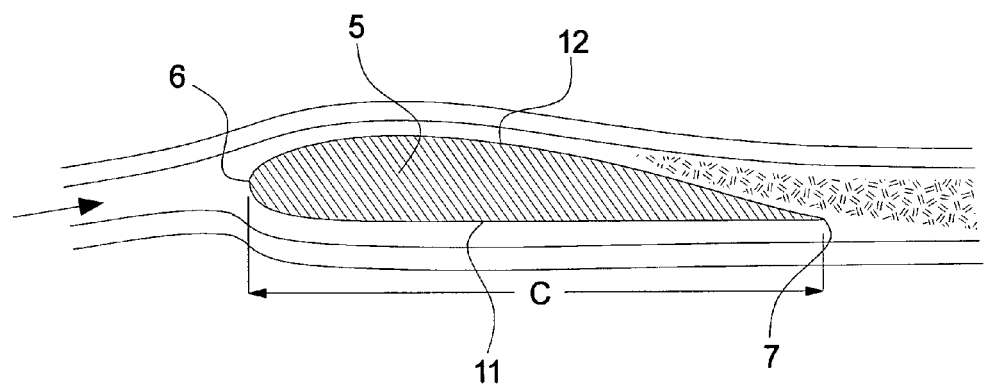
Figure 5:
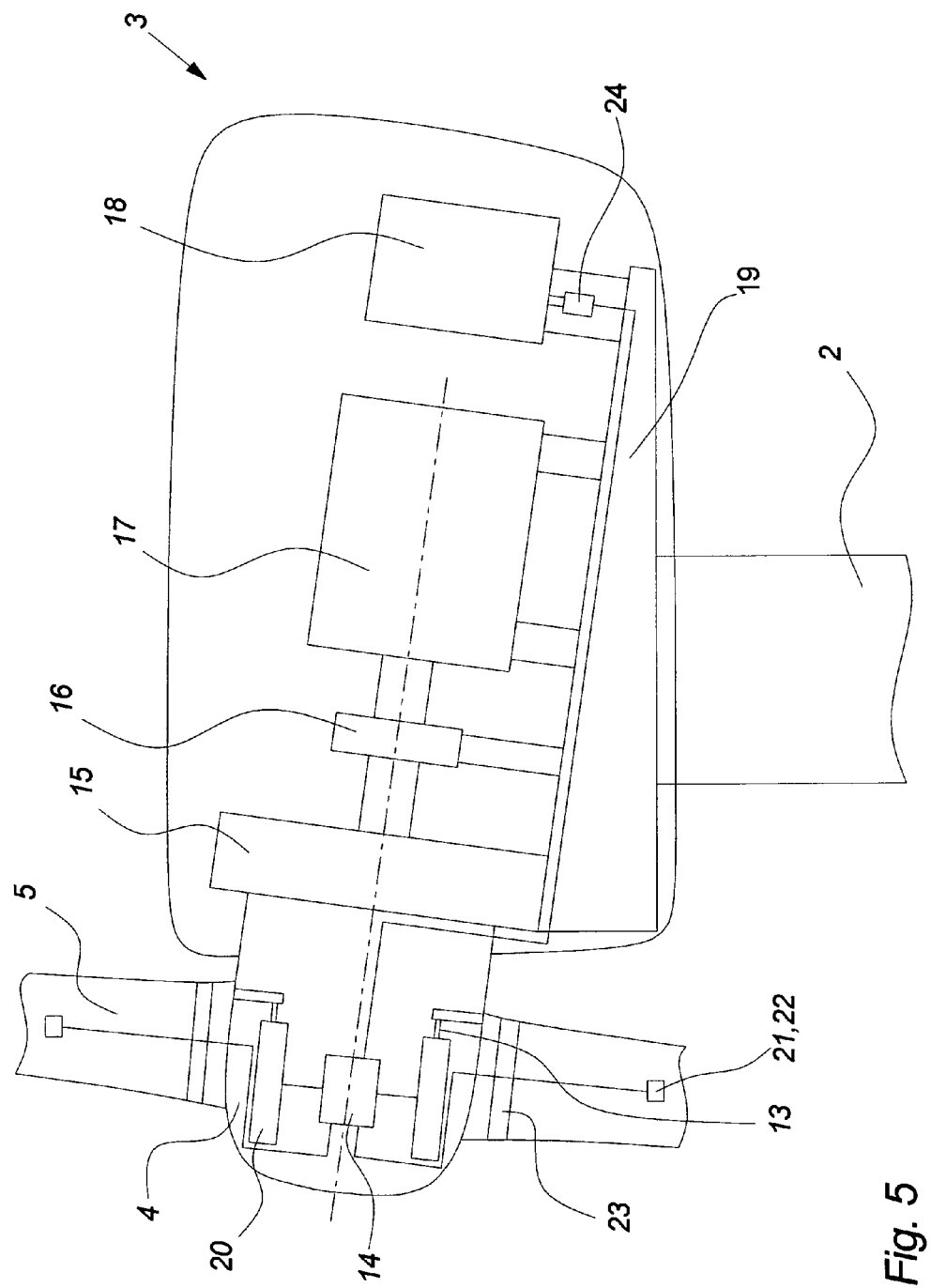
Figure 6:
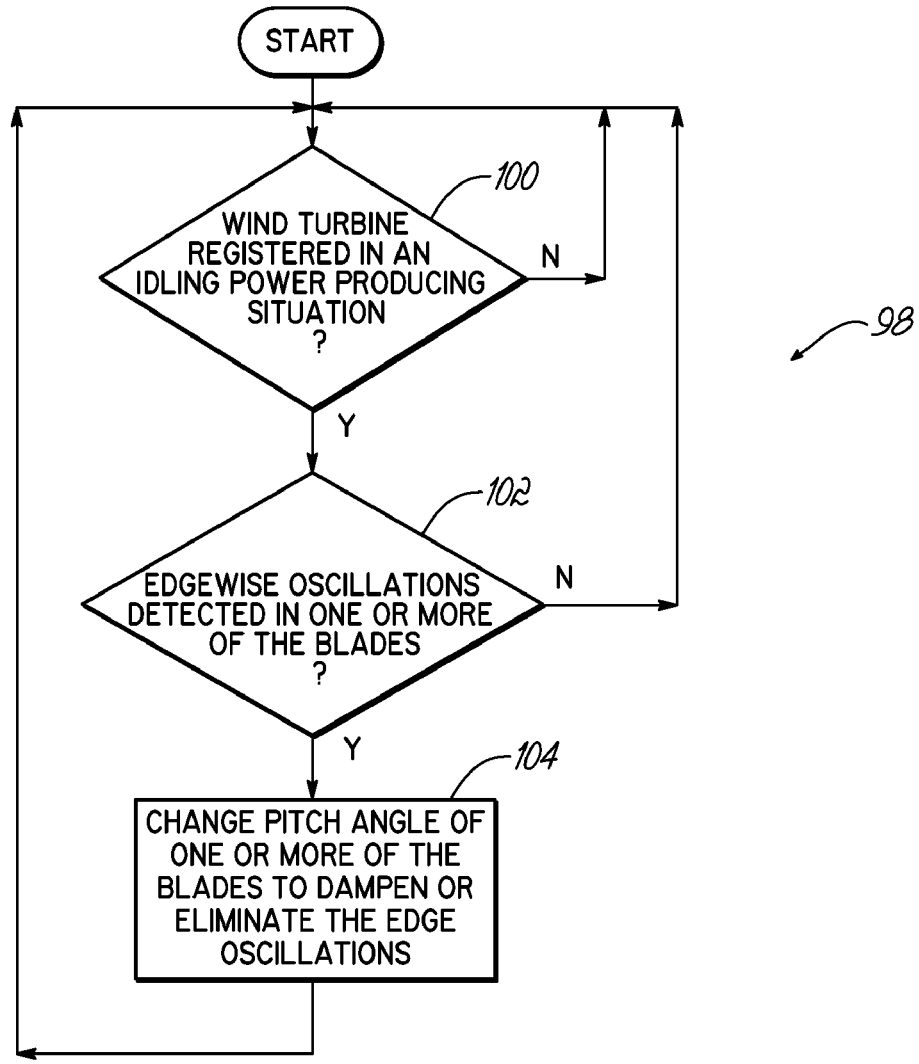

The invention will be described in the following with reference to the figures in which FIG. 1. illustrates a large modern operating wind turbine known in the art, as seen from the front, FIG. 2 illustrates a wind turbine blade, as seen from the front, FIG. 3 illustrates a cross-section of an idling wind turbine blade in a non-stall situation, as seen from the root of the blade, FIG. 4 illustrates a cross-section of an idling wind turbine blade in a stall situation, as seen from the root of the blade, FIG. 5 illustrates a simplified cross section of a nacelle, as seen from the side, and FIG. 6 is a flow chart illustrating a process flow for damping or eliminating edgewise oscillations in one or more rotor blades in accordance with an embodiment of the invention.

DETAILED DESCRIPTION OF RELATED ART

FIG. 1 illustrates a modern operating wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

In this embodiment the wind turbine 1 comprise three blades 5 but in another embodiment the wind turbine 1 could comprise another number of blades 5 such as one, two, four or more.

DETAILED DESCRIPTION OF THE INVENTION

FIG. 2 illustrates a wind turbine blade 5, as seen from the front/pressure side 11. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

A wind turbine blade 5 typically has an elastic centre which is closer to the leading edge 6 than to the trailing edge 7, at least regarding most parts of the blade 5. If edgewise oscillations occur at a frequency at or close to the blades first natural edgewise frequency, especially the trailing edge 7 is therefore exposed to considerable strain, which under certain conditions could reduce the life of the blade 5.

FIG. 3 illustrates a cross-section of an idling wind turbine blade 5 in a non-stall situation, as seen from the root of the blade 5.

In this embodiment the blade 5 is a blade 5 of an ordinary pitch regulated wind turbine 1 where the blade 5 is feathered i.e. the blade 5 is shown in a parking position where the blade 5 is pitched so that the chord C of the blade 5 is substantially parallel with the incoming wind. Because wind turbine blades 5 known in the art twists throughout their longitudinal extend it will usually only be for some parts of the blade 5 that the chord C is substantially parallel with the incoming wind when put in parking position.

A blade 5 of a pitch controlled wind turbine 1 is typically pitched so that the leading edge 6 is facing the incoming wind, when the blade 5 is feathered whereas a blade 5 of an active stall regulated wind turbine 1 typically will make the trailing edge 7 face the incoming wind, when the blade 5 is feathered but otherwise it is substantially the same mechanisms affecting the blades 5 of the two wind turbine types when idling.

When the pitch controlled wind turbine 1 is producing power during normal operation, the turbines electronic controller checks the power output of the turbine 1 e.g. several times per second. When the power output becomes too high, the controller sends an order to the blade pitch mechanism 13, which immediately pitches (turns) the rotor blades 5 slightly out of the wind. Likewise, the blades 5 are turned back into the wind whenever the wind drops again. During normal operation the blades 5 of a pitch regulated wind turbine 1 usually only pitch a fraction of a degree at a time—and the rotor 4 will be turning at the same time.

If the wind speed of the incoming wind increases above a certain level, such as 25 meters/sec., the controller will feather the blades 5 to make the rotor 4 stop rotating or at least making it idle and the wind turbine will stop producing power to the utility grid. This is among other reason done to protect the blades 5 and the rest of the wind turbine 5 from damaging overload at high wind speeds.

If the rotor 4 is not directly fixed against rotation when the wind turbine 1 is idle, the idling situation does not necessarily mean that the rotor 4 stop rotating. Actually the rotor 4 will more often than not rotate slowly and it has also happened that the rotor 4 is rotating backwards in relation to the direction of rotation, when the wind turbine 1 is not idling i.e. when it is producing power to a utility grid.

FIG. 4 illustrates a cross-section of an idling wind turbine blade 5 in a stall situation, as seen from the root 9 of the blade 5.

The blade 5 illustrated in FIG. 4 is a feathered blade 5 on an idling active stall regulated wind turbine 1, illustrated during a sudden gust of wind creating an undesired stall situation. In another embodiment it could also be a blade 5 on an idling pitch regulated wind turbine 1.

Technically an active stall controlled wind turbine 1 resembles a pitch controlled wind turbine 1, in that they both have pitchable blades, and in order to get a reasonably large torque (turning force) at low wind speeds, the active stall controlled wind turbine 1 will usually be programmed to pitch the blades 5 much like a pitch controlled wind turbine 1 at low wind speeds. When the active stall controlled wind turbine 1 reaches its rated power, however, one will notice an important difference from the pitch controlled wind turbines 1: If the generator 17 is about to be overloaded, the active stall controlled wind turbine 1 will pitch its blades 5 in the opposite direction from what a pitch controlled wind turbine 1 does. In other words, it will increase the angle of attack of the rotor blades 5 in order to make the blades 5 go into a deeper stall, thus wasting the excess energy in the wind.

Feathered blades 5 on an idling pitch controlled or stall controlled wind turbine 1 do usually not stall, in that the wind will pass the blade 5 substantially undisturbed and the yaw mechanism of the wind turbine 1 will ensure that the rotor plane substantially always is perpendicular to the direction of the incoming wind, making the wind pass the blades 5 substantially as illustrated in FIG. 3 and if the feathered blades 5 should stall it is usually of very little or no consequence.

However, under certain circumstances gusts of wind from varying directions can arise so fast, that the turbines 1 control system or the yaw mechanism is not able to react fast enough and for a short period of time stall can occur. These short stall periods can induce edgewise oscillations in the blade 5, which potentially can be very damaging. Particularly if these gusts happen rhythmically at a frequency at or close to the blades 5 first natural edgewise frequency the energy of the edgewise oscillations can build up.

Likewise, aerodynamic phenomenon's like Von Kármán vortex street, periodic flow separation, turbulence or local vortexes can under certain circumstances induce edgewise oscillations in the feathered blade 5, particularly if these phenomenon's happen periodically or rhythmically at or in phase with a frequency at or close to the blades 5 first natural edgewise frequency.

FIG. 5 illustrates a simplified cross section of a nacelle 3 of a pitch or active stall regulated wind turbine 1, as seen from the side. Nacelles 3 exists in a multitude of variations and configurations but in most cases the drive train in the nacelle 3 comprise one or more of the following components: a gear 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the strengthening structure 19 only extends along the bottom of the nacelle 3 e.g. in form of a bed frame to which some or all the components 15, 16, 17, 18 are connected. In another embodiment the strengthening structure 19 could comprise a gear bell transferring the load of the rotor 4 to the tower 2, or the load carrying structure 19 could comprise several interconnected parts such as latticework.

In this embodiment of the invention the drive train is established in an angle in relation to a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

In this embodiment of the invention detection means 21 are accelerometers 22 placed in each of the blades 5 to detect if the individual blade 5 oscillates edgewise. In that the amplitude of edgewise oscillations of a blade 5 will increase with the distance from the root 9 of the blade 5 the detection means 21 are in this embodiment of the invention accelerometers placed inside the blades 5 at a given distance from the root 9 of the blade 5.

The detection means 21 could also be placed at the back of the nacelle 3 in the form of one or more accelerometers 22 attached to the back of the strengthening structure 19. The accelerometer 22 would then be mounted in such a way that edgewise oscillations of the blades 5 leading to horizontal or substantially horizontal oscillations of the nacelle and/or vertical oscillations trying to tilt the nacelle vertically were detected.

Edgewise oscillations of the blades 5 can induce oscillations of the nacelle 3 e.g. making the nacelle 3 oscillate slightly around the centre of the tower 2, i.e. in the yawing direction, which is why these oscillations can be detected relatively reliably at the back of the nacelle 3. Typical frequencies of edgewise oscillations (first natural frequency) are in the interval of 0.9-1.8 Hz.

In another embodiment of the invention the detection means 21 could be other types of sensors than accelerometers 22—such as microphones, strain-gauges, optical fibres or other, it or they could be placed differently in the blades 5 or the oscillation sensors 21 could be placed outside the blades 5 such as in or at the rotational axis 26 of a rotor 4 e.g. in the hub 14 centre or in the nacelle 3.

The detection means 21 could simply be means already present in the wind turbine 1 for detecting loads or other during normal operation of the wind turbine 1 such as the tower oscillation sensors usually placed at the tower top to detect if the tower oscillates, where the edgewise oscillations of the blades 5 could be transmitted through the nacelle 3 to the tower 2 and be detected as slight vibrations of the tower 2. It could also be load sensors placed at the root 9 of the blade 5 to detect the load on the blade 5 during normal operation.

The detection means 21 are in this embodiment of the invention connected to control means 14. If edgewise oscillations of the blades 5 are detected or if edgewise oscillations above a certain level are detected, the control means 14 can initiate that one or more of the blades 5 are pitched.

As previously explained the blades 5 of an active stall regulated wind turbine 1 or a pitch regulated wind turbine are provided with a pitch mechanism 13. In the illustrated embodiment the blades 5 of the wind turbine 1 are connected to the hub 14 through pitch bearings 23, enabling that the blades 5 can rotate around their longitudinal axis.

In this embodiment the pitch mechanism 13 comprise means for rotating the blades in the form of linear actuators 20 connected to the hub 14 and the respective blades 5.

In a preferred embodiment the linear actuators 20 are hydraulic cylinders. In another embodiment the pitch mechanism 13 could comprise stepper motors or other means for rotating the blades 5.

The wind turbine 1 is also provided with registration means 24 for detecting if the wind turbine 1 is operating in an idling power producing situation in relation to the utility grid i.e. if the wind turbine 1 substantially is not producing power to the utility grid, to which the wind turbine 1 would deliver power during normal operation of the wind turbine 1.

In this embodiment the registration means 24 is an ammeter measuring if there is any electrical output from the converter 18 or at least if the electrical output is below a certain low and insignificant level, but in another embodiment the registration means 24 could be a voltmeter or other and the registration means 24 could measure or register elsewhere such as on the generator 17, on the power lines in or outside the wind turbine 1, at a central power unit outside the wind turbine 1 or elsewhere.

The registration means 24 also includes means which only indirectly detects if the wind turbine 1 is idling, e.g. encoders, tachometers or other detecting if the main shaft or other ordinarily rotating parts are rotating or at what speed they are rotating. If these parts do not rotate or only rotate at very low speed it could indicate that the wind turbine 1 was idling.

In this embodiment the control means 14 is placed in the hub 14 but in a more preferred embodiment the control means 14 would be placed in the nacelle 3, in the tower 2, in a neighboring house or elsewhere e.g. at the same location as the general pitch control means (not shown) for the controlling the pitch in relation to load, power or other during normal operation of the wind turbine 1 or even integrated in these general pitch control means.

In this embodiment the control means 14 are connected to the linear actuators 20 for controlling the pitch angle of the blades 5 in response to the measurements of the detection means 21 and the registration means 24.

If the edgewise oscillations has not dropped below a predetermined level within a predetermined period of time the control means 14 could comprise means for sending of an alarm initiating that dampening procedures was commenced. Likewise, if the edgewise oscillations continues to grow in size—even though the blades 5 have been pitched to counteract the oscillations—an alarm signal could be transmitted to an external surveillance unit or other.

In an embodiment of the invention the blades 5 are returned to their original or substantially to their original parking position, immediately or after a specific predetermined time but in a preferred embodiment the blades 5 are returned, when the detection means 21 detects that the size of the oscillations has dropped below a certain predefined level again.

In a further embodiment the blades 5 could also be maintained in their new pitch angle and then only moved again if further edgewise oscillations where detected, if the rotor was running to fast, slow or in the wrong direction, if the wind turbine was returned to operation mode or if other conditions necessitate a change of the pitch angle. Hereby the pitch angle is only changed when absolutely necessary, whereby energy is saved and wear is reduced.

In this embodiment of the invention the control means 14 further comprise a dead band or another control method which ensures that the pitch angle difference is only created when the edgewise oscillations of the blades 5 are above a certain predefined level.

In another embodiment of the invention the control means 14 could also comprise means for increasing the gain of the control means if the size of the oscillations rises above a certain predefined level, if the size of the oscillations has not been dampened below a predefined level within a certain predefined time such as between 1 and 1000 seconds, preferably between 10 and 500 seconds or if the size of the oscillations has been above a certain predefined level for at least a certain predefined time.

The gain is the part of the control algorithm in the control means 14 which controls the size of the reaction at a given oscillation level e.g. by controlling how much the input signal from the detection means 21 (e.g. the amplitude of the edgewise oscillations) is amplified in the control algorithm in the control means 14, hereby controlling how much the blade is pitched at a given input signal.

If the detection means 21 detects edgewise oscillations in one blade 5 the control means 14 could initiate that only this blade 5 was pitched but if the wind conditions and other are so that one blade 5 starts to oscillate, it is also feasible that further blades 5 start to oscillate and it is therefore possible that more than one blade 5 is pitched away from the parking position at the same time and it is of course also possible that the pitch angle of only one blade 5 is changed at a time, leaving the pitch angle of the remaining blades 5 unchanged during the attempt to dampen or eliminate edgewise oscillations of the blades 5.

The above mentioned predefined level e.g. determining if the blades 5 should be returned to their original pitch angle position, determining if the pitch angle should be changed, determining if an alarm procedure should be started and other could be determined as a percentage-wise exceeding of a known load, e.g. if it was detected that the gravity pull in the blades 5 would result in a given maximum load measured by the load sensors at the root 9 of the blade 5, this predefined level could be that this given maximum load was exceeded by at least 5% and preferably by at least 15% such as 20%, indicating that the blade 5 is influenced by other forces than gravity i.e. the blade 5 could be oscillating edgewise particularly if this load exceedings happens rhythmically and within one or, more frequency ranges such as between of 0.1 and 5 Hz, preferably between 0.5 and 3 Hz indicating that the exceedings originates from edgewise oscillations and not just from some brief aerodynamic phenomenon's.

Likewise, if the detection means 21 was one or more accelerometers placed in the blades 5, in the hub, in it nacelle 3 or in the tower 2 the predetermined levels could also be defined as a percentage-wise exceeding of a known acceleration level.

The levels could also be defined as a percentage of an acceptable load or acceleration or simply be based on statistical or empiric values or based on practical tests.

FIG. 6 is a flow chart illustrating a process flow 98 for damping or eliminating edgewise oscillations in one or more rotor blades in accordance with an embodiment of the invention. In block 100, a determination is made by the registration means 24 whether or not the wind turbine is registered in an idling power producing situation. If the wind turbine is registered in an idling power producing situation, then a determination is made by the detection means 21 whether or not edgewise oscillations detected in one or more of the blades (block 102). If edgewise oscillations detected in one or more of the blades, the control means 14 is adapted to change the pitch angle of one or more of said blades to dampen or eliminate the edgewise oscillations (block 104). The control means 14 may use the linear actuators 20 to control the pitch angle of the blades 5 in response to the measurements of the detection means 21 and the registration means 24.

The invention has been exemplified above with reference to specific examples of wind turbines 1, detection means 21, embodiments of a method for damping edgewise oscillations and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Leading edge
7. Trailing edge
8. Tip
9. Root
10. Crack
11. Pressure side
12. Leeward side
13. Pitch mechanism
14. Control means
15. Gear
16. Breaking system
17. Generator
18. Converter
19. Strengthening structure
20. Actuator
21. Detection means
22. Accelerometer
23. Pitch bearing
C. Chord

The invention claimed is:

1. A wind turbine comprising:
    a rotor including one or more pitchable blades,
    a registrant for registering an idling power producing situation of said wind turbine in relation to a utility grid,
    a detector for detecting edgewise oscillations in one or more of said blades, and
    a controller for controlling the pitch angle of one or more of said blades, the controller including a timer for giving of an alarm signal if the size of said edgewise oscillations has not dropped below a predefined level within a predefined period of time, wherein said controller is adapted for changing the pitch angle of one or more of said blades when said registrant registers that said wind turbine is operating in an idling power producing situation and said detector detects edgewise oscillations in one or more of said blades, hereby damping or eliminating said edgewise oscillations.

2. The wind turbine of claim 1, wherein said controller comprises a blade pitcher for pitching said blades in a direction which increases the lift of said blades, if said detector detects edgewise oscillations in one or more of said blades.

3. The wind turbine of claim 1, wherein said controller comprises a pitch angle changer for changing the pitch angle of all said blades of said rotor substantially equally, if said detector detects edgewise oscillations in one or more of said blades.

4. The wind turbine of claim 1, wherein said detector includes one or more load sensors placed in or at said blade.

5. The wind turbine of claim 1, wherein said detector includes one or more accelerometers placed in or at said blade.

6. The wind turbine of claim 1, wherein said detector includes one or more accelerometers placed in a nacelle of said wind turbine.

7. The wind turbine of claim 1, wherein said controller comprises a pitch angle changer for changing said pitch angle of one or more of said blades between 0.5° and 30° if said detector detects edgewise oscillations in one or more of said blades.

8. The wind turbine of claim 1, wherein said controller comprise a blade returner for returning said one or more blades to their original pitch angle position, when said detector detects that the size of said edgewise oscillations is below a predefined level.

9. The wind turbine of claim 1, wherein said controller comprise a pitch angle changer for only changing the pitch angle of one or more of said blades if said detected edgewise oscillations is above a predefined level.

10. A method for controlling a wind turbine, comprising:
registering if the wind turbine is operating in an idling power producing situation in relation to a utility grid;
establishing a edgewise oscillation value of a wind turbine blade of the wind turbine;
changing the pitch angle of the blade if the wind turbine is operating in an idling power producing situation and the edgewise oscillation value is above a predefined level, hereby damping or eliminating the edgewise oscillation;
obtaining a predetermined time; and
transmitting an alarm signal if the edgewise oscillation value has not dropped below the predefined level within the predetermined time.

11. The method of claim 10, further comprising:
obtaining a further predetermined level;
comparing the edgewise oscillation value with the further predetermined level; and
returning the blade to its original pitch angle position when the edgewise oscillation value has dropped below the further predetermined level.

12. The method of claim 10, wherein the pitch angle of all the blades of the wind turbine are changed substantially equally if the edgewise oscillation value is above the predefined level.

13. The method of claim 10, further comprising:
measuring a load of the blade,
wherein the edgewise oscillation value is established by the load measurements of the blade.

14. The method of claim 10, further comprising:
obtaining a predetermined rotor rotational speed,
wherein the blades are pitched in a direction which reduces the lift of the blades, if the rotational speed of a rotor comprising the blades is above the predetermined rotor rotational speed.

15. The method of claim 10, further comprising:
obtaining a predetermined rotor rotational speed,
wherein the blades are pitched in a direction which increases the lift of the blades, if the rotational speed of a rotor comprising the blades is below the predetermined rotor rotational speed.

16. Use of a method of claim 10, wherein the wind turbine is a pitch or active stall controlled wind turbine which comprises a detector for detecting edgewise oscillations.

* * * * *

UNITED STATES PATENT AND TRADEMARK OFFICE
CERTIFICATE OF CORRECTION

PATENT NO. : 7,952,217 B2
APPLICATION NO. : 12/744820
DATED : May 31, 2011
INVENTOR(S) : Thomas S. Nielsen et al.

It is certified that error appears in the above-identified patent and that said Letters Patent is hereby corrected as shown below:

At column 1, line number 21, change "is" to --are-- and at line number 28, change "is" to --are-- and at line number 40, change "changes" to --change-- and at line number 42, change "is" to --are--.

At column 2, line number 44, change "periode" to --period-- and at line number 51, change "that are" to --are-- and at line number 65, change "shifts" to --shift--.

At column 3, line number 35, change "is" to --are-- and at line number 49, change "is" to --are--.

At column 4, line number 48, change "In" to --It--.

At column 5, line number 3, change "is" to --are-- and at line number 34, change "comprise" to --comprises-- and at line number 62, change "twists" to --twist--.

At column 6, line number 7, change "turbines" to --turbine's-- and at line number 21, change "That is among other reason" to --That is, among other reasons,-- and at line 22, change "5" to --1-- and at line number 26, change "stop" to --stops-- and at line number 63, change "turbines" to --turbine's--.

At column 7, line number 8, change "phenomenon's" to --phenomena-- and at line 9, change "blades" to --blade's-- and at line number 13, change "'exists" to --exists-- and at line 15, change "comprise" to --comprises-- and at line number 36, change "is for among other reasons" to --is, among other reasons,-- and at line number 37, change "can be angled" to --to be angled-- and at line number 66, change "," to --;--.

At column 8, line number 23, change "comprise" to --comprises-- and at line number 55, after "for", delete "the" and at line number 63, change "has" to --have-- and at line 66, change "initiating" to --indicating-- and change "was" to --were--.

Signed and Sealed this
Sixth Day of September, 2011

David J. Kappos
*Director of the United States Patent and Trademark Office*

CERTIFICATE OF CORRECTION (continued)
U.S. Pat. No. 7,952,217 B2

At column 9, line number 14, change "to" to --too-- and at line number 67, change "phenomenon's" to --phenomena--.

At column 10, line 16, after "oscillations", insert --are-- and in line number 17, after "oscillations", insert --are--.

In the Claims:

At column 11, claim number 8, line number 35, change "comprise" to --comprises--.

At column 11, claim number 9, line number 40, change "comprise" to --comprises-- and at line number 42, change "is" to --are--.